United States Patent
Kim et al.

(10) Patent No.: US 10,710,048 B2
(45) Date of Patent: Jul. 14, 2020

(54) CO-PRECIPITATION REACTOR

(71) Applicant: LG Chem, Ltd., Seoul (KR)

(72) Inventors: Hyun Uk Kim, Daejeon (KR); Seong Bae Kim, Daejeon (KR); Chang Jun Moon, Daejeon (KR); Yi Rang Lim, Daejeon (KR); Kyoung Wan Park, Daejeon (KR); Eun Hee Kim, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 16/478,691

(22) PCT Filed: Dec. 26, 2018

(86) PCT No.: PCT/KR2018/016661
§ 371 (c)(1),
(2) Date: Jul. 17, 2019

(87) PCT Pub. No.: WO2019/135540
PCT Pub. Date: Jul. 11, 2019

(65) Prior Publication Data
US 2020/0047147 A1   Feb. 13, 2020

(30) Foreign Application Priority Data
Jan. 3, 2018  (KR) .................. 10-2018-0000576

(51) Int. Cl.
*B01J 19/18* (2006.01)
*B01D 29/68* (2006.01)
*B01D 29/33* (2006.01)
*B01J 19/00* (2006.01)
*B01D 35/02* (2006.01)

(52) U.S. Cl.
CPC .............. *B01J 19/18* (2013.01); *B01D 35/02* (2013.01)

(58) Field of Classification Search
CPC .......... B01J 19/18; B01J 19/00; B01D 35/02; B01D 2201/12; B01D 29/68; B01D 29/333
USPC ........................................... 422/129
See application file for complete search history.

(56) References Cited

U.S. PATENT DOCUMENTS

| | | | |
|---|---|---|---|
| 9,162,170 B2* | 10/2015 | Onishi | B01D 39/10 |
| 2004/0060858 A1* | 4/2004 | Lucas | B01D 29/21 |
| | | | 210/338 |
| 2005/0129608 A1* | 6/2005 | Takehara | B82Y 30/00 |
| | | | 423/445 B |

FOREIGN PATENT DOCUMENTS

| | | |
|---|---|---|
| JP | H08229384 A | 9/1996 |
| JP | 2005254166 A | 9/2005 |
| KR | 100887186 B1 | 3/2009 |

(Continued)

OTHER PUBLICATIONS

Search report from International Application No. PCT/KR2018/016661, dated Apr. 10, 2019.

*Primary Examiner* — Huy Tram Nguyen
(74) *Attorney, Agent, or Firm* — Lerner, David, Littenberg, Krumholz & Mentlik, LLP

(57) ABSTRACT

A co-precipitation reactor with a continuous filtering system mounted, wherein the co-precipitation reactor includes a main body accommodating a reactant for reaction therein, an input unit inputting the reactant into the main body, and a filter unit installed in the main body to filter a precursor of the precursor generated by reacting with the reactant in the main body and a reaction solution.

19 Claims, 10 Drawing Sheets

(56) References Cited

FOREIGN PATENT DOCUMENTS

| KR | 20100059601 A | 6/2010 |
| KR | 20120084460 A | 7/2012 |
| KR | 20150093320 A | 8/2015 |

* cited by examiner

CO-PRECIPITATION REACTOR

CROSS-REFERENCE TO RELATED APPLICATION

The present application is a national phase entry under 35 U.S.C. § 371 of International Application No. PCT/KR2018/016661 filed on Dec. 26, 2018, which claims priority from Korean Patent Application No. 10-2018-0000576, filed on Jan. 3, 2018, the disclosures of which are incorporated herein by reference.

TECHNICAL FIELD

The present invention relates to a co-precipitation reactor, and more particularly, to a co-precipitation reaction with a continuous filtering system mounted.

BACKGROUND ART

Although there is difference depending on manufacturing methods, a process of manufacturing various chemical materials is generally accompanied by a crystallization process, a growth process, a cleaning process, a filtering process, and a drying process.

For example, a method for manufacturing a positive electrode active material for a secondary battery is largely classified into a solid-phase reaction method and a wet method. The solid-phase reaction method is a process of mixing raw powder to fire and pulverize the mixture several times.

The wet method may be classified into spray pyrolysis and co-precipitation. The spray pyrolysis is a method in which a raw material is dissolved to generate a droplet having a predetermined size and momentarily fire the droplet so as to obtain metal oxide. The co-precipitation is a method in which a raw material is dissolved to synthesize and grow a metal hydroxide precursor by adjusting a pH, and solution containing the grown precursor is filtered and dried to perform a predetermined firing process so as to obtain a positive electrode active material for a secondary battery.

A technique with respect to a co-precipitation reactor is disclosed in Korean Patent Publication No. 10-2010-0059601.

However, in such a co-precipitation reactor according to the related art, all initial products are discarded until reactants are introduced so that conditions such as a temperature, a concentration, and the like, within the reactor are the same, and thus, production yield is deteriorated.

Alternatively, a reaction time is limited by a size of the reactor, and thus, an output of the reactants is limited. As a result, improvement of uniformity of a particle size is limited due to the limitation of the reaction time.

DISCLOSURE OF THE INVENTION

Technical Problem

Therefore, the present invention has been made to solve the above problems, and an object of the present invention is to provide a co-precipitation reactor to which a continuous filtering system having an improved filtration flow rate is applied.

Technical Solution

A co-precipitation according to an embodiment of the present invention includes a main body accommodating a reactant for reaction therein, an input unit inputting the reactant into the main body, and a filter unit installed in the main body to filter a precursor of the precursor generated by reacting with the reactant in the main body and a reaction solution.

The main body may include a drain part for discharging the precursor within the main body to the outside.

The drain part may be formed on one or more of a lower portion of the main body or an upper circumferential portion of the main body.

The main body may include an impeller part for mixing the reactants within the main body at a central portion of the inside thereof.

The impeller part may be fixed to an upper end of the main body, and the input unit may be provided in plurality on the upper end of the main body so as to be disposed around the impeller part.

An operation for detaching the precursor adhering to the filter unit may be performed during a pause for which the input of the reactant into the input unit is stopped, and the mixing of the reactant by using the impeller is stopped.

The filter unit may include a filter disposed in the main body to filter the precursor of the precursor generated by reacting with the reactant and the reaction solution and a flow tube formed to be connected to the filter, extending to the outside of the main body, and discharging the reaction solution, from which the precursor is filtered by the filter, to the outside.

The co-precipitation may further include a collection tank communicating with the flow tube to collect the reaction solution discharged into the flow tube.

The co-precipitation may further include a vacuum pump communicating with the collection tank to drain the reaction solution within the main body from the flow tube to the collection tank.

The co-precipitation may further include a control unit controlling an operation of the vacuum pump.

The co-precipitation may further include an injection unit communicating with the flow tube to inject an inert material into the filter through the flow tube.

The inert material injected from the injection unit into the filter may detach the precursor adhering to the filter.

The inert material may include an inert gas or an inert liquid.

The co-precipitation may further include a control unit controlling an operation of the injection unit.

The filter may include a pleated filter.

The filter may be made of a stainless steel (SUS) material.

The filter unit may be provided in plurality so as to be spaced apart from each other.

The filter formed in each of the plurality of filter units may have different pore sizes, and the filters may operate in order from the filter having a relatively small pore size to the filter having a relatively large pore size according to an operation time preset by the control unit.

The preset operation time may be differently set according to the pore sizes of the plurality of filters, and as the pore size increases, the preset operation time may increase.

In the filter formed in each of the plurality of filter units, when one filter operates by the control unit, operations of other filters are stopped.

Advantageous Effects

According to the present invention, the production yield of the precursor may be improved.

According to the present invention, the filtration flow rate may be improved by using the filter unit having the pore size of 3 μm to 5 μm to realize the continuous filtering system.

According to the present invention, the continuous filtering system capable of cleaning the filter unit during the production process may be realized.

According to the present invention, since the filter unit is detachable, all the continuous filtering system, the batch system, and the continuous stirred-tank reactor (CSTR) may be utilized.

According to the present invention, the quality deviation of the produced precursor may be uniform.

MODE FOR CARRYING OUT THE INVENTION

Figure 1:
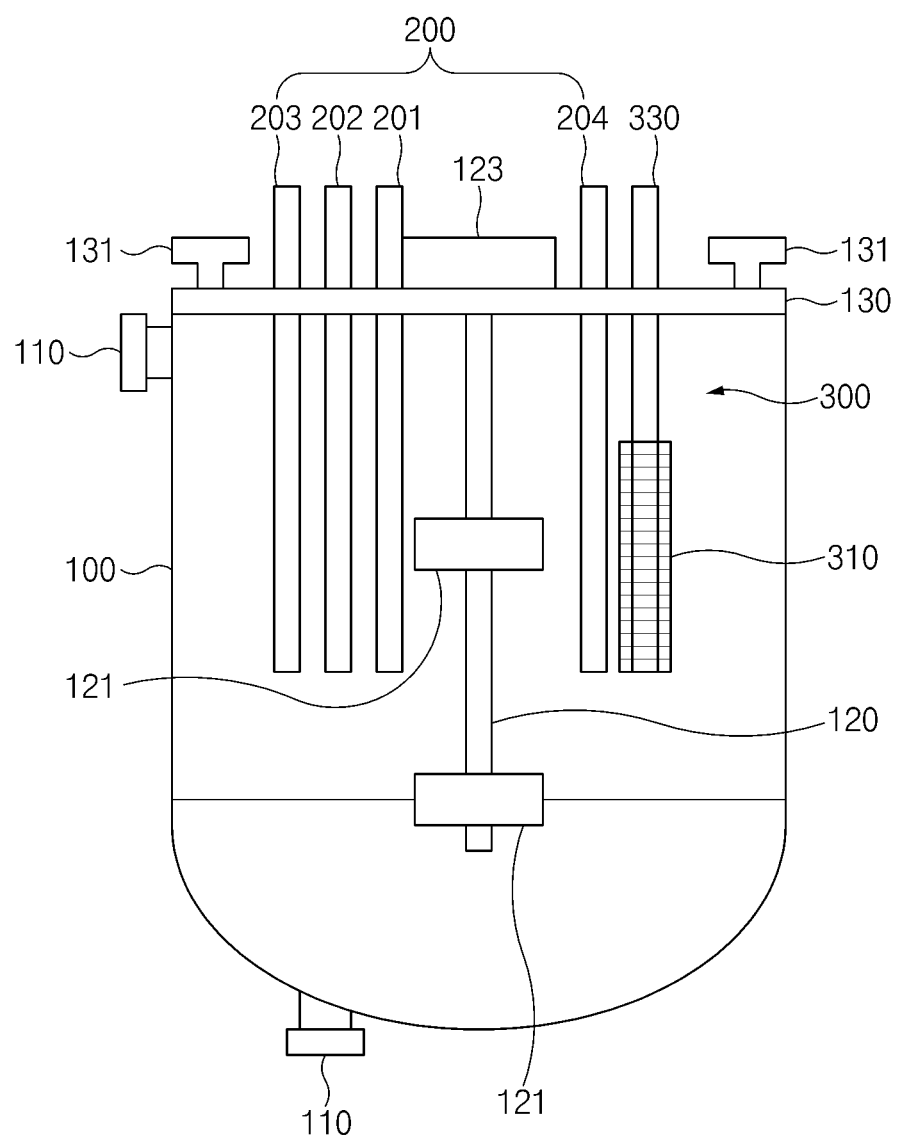
FIG. 1 is a front view illustrating a main part of a co-precipitation reactor according to an embodiment of the present invention.

Hereinafter, a co-precipitation reactor according to a preferred embodiment of the present invention will be described in detail with reference to the accompanying drawings.

Terms or words used in the specification and claims should not be construed as limited to a lexical meaning, and should be understood as appropriate notions by the inventor based on that he/she is able to define terms to describe his/her invention in the best way to be seen by others. Therefore, embodiments and drawings described herein are simply exemplary and not exhaustive, and it will be understood that various equivalents may be made to take the place of the embodiments.

In the drawings, the dimension of each of components or a specific portion constituting the component is exaggerated, omitted, or schematically illustrated for convenience in description and clarity. Thus, the dimension of each element does not entirely reflect an actual size. Moreover, detailed descriptions related to well-known functions or configurations will be ruled out in order not to unnecessarily obscure subject matters of the present invention.

Figure 2:
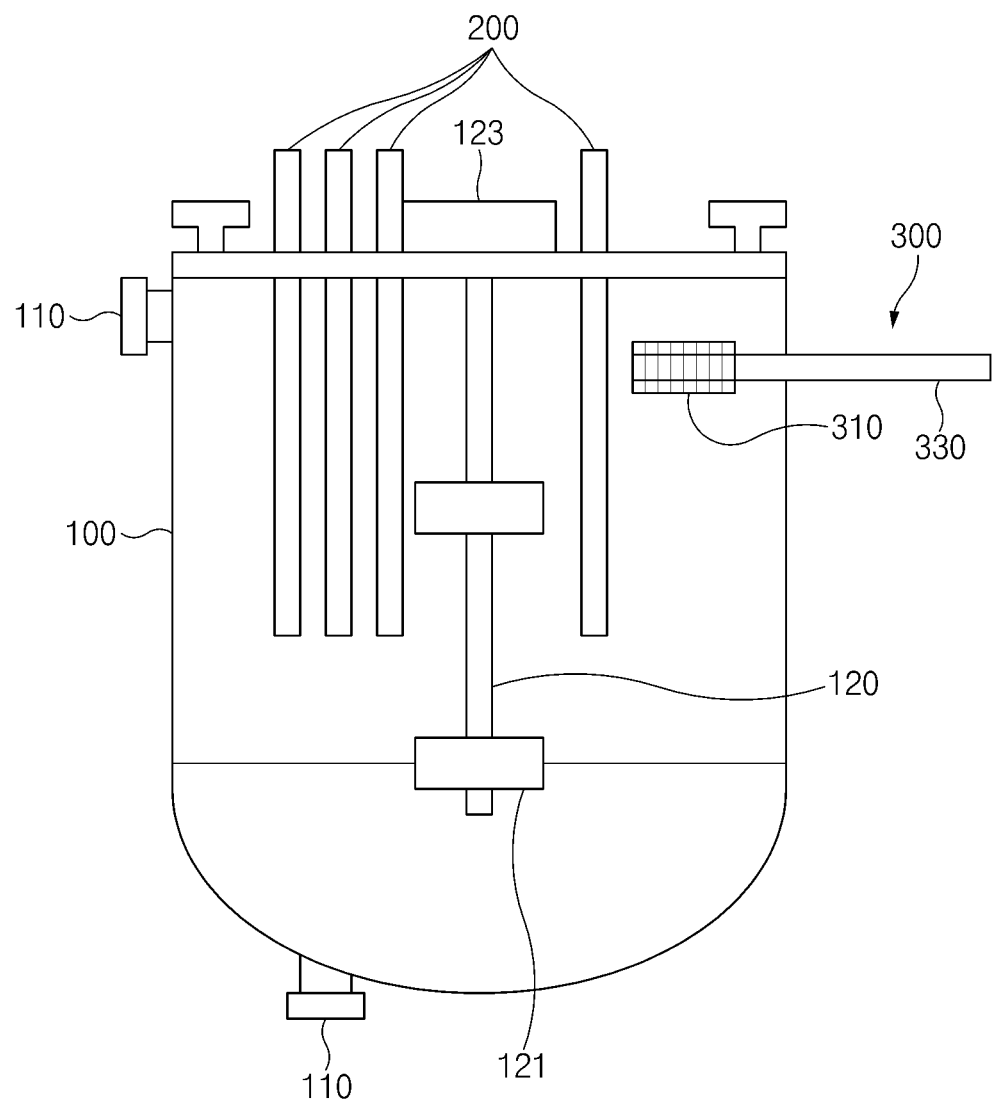
FIG. 2 is a front view illustrating a main part of a co-precipitation reactor according to another embodiment of the present invention.

FIG. 1 is a front view illustrating a main part of a co-precipitation reactor according to an embodiment of the present invention, and FIG. 2 is a front view illustrating a main part of a co-precipitation reactor according to another embodiment of the present invention.

As illustrated in FIG. 1, a co-precipitation reactor according to an embodiment of the present invention includes a main body 100 accommodating a reactant for reaction therein, an input unit 200 inputting the reactant into the main body 100, and a filter unit 300 installed in the main body 100 to filter a precursor of the precursor generated by reacting with the reactant in the main body 100 and a reaction solution.

The main body 100 may be provided as a cylindrical body having an opened upper end and include a drain part 110 for discharging the precursor to the outside.

A cover 130 may be installed on the upper end of the main body 100 to cover the opened upper end.

The cover 130 may fix an edge portion through a fixing part 131.

The drain part 110 may be formed on one or more of a lower portion of the main body 100 or an upper circumferential portion of the main body 100.

The drain part 110 formed on the lower portion of the main body 100 may be suitable for discharging the precursors accumulated in the main body 100 to the outside and used mainly in a batch reactor.

The drain part 110 formed on the upper circumferential portion of the main body 100 may be suitable for discharging the precursors continuously accumulated in the main body 100 to the outside and used mainly in a continuous stirred-tank reactor (CSTR).

In the co-precipitation reactor according to an embodiment of the present invention, the drain part 110 may be formed on all the lower portion of the main body 100 and the upper circumferential portion of the main body 100. As a result, when the filter unit 300 is separated from the main body 100, the co-precipitation reactor may be used as the batch reactor or the continuous stirred-tank reactor as necessary.

The main body 100 may include an impeller part 120 for mixing the different reactants input into the main body 100 at an inner central side.

An outer end of the impeller part 120 may be fixed to the cover 130 covering the upper opening of the main body 100. That is, the outer end of the impeller part 120 may be fixed to be connected to a driving device 123 such as a motor, which is installed outside the cover 130. Also, when the driving device 123 is driven, the impeller part 120 may rotate.

An inner end of the impeller part 120 may extend up to a side of a lower portion of the inside of the main body 100, and a wing part 121 may be formed inside the main body 100 between an outer end and the inner end of the impeller part 120.

The wing part 121 may be provided in plurality. The plurality of wing parts 121 may be equally installed between the outer end and the inner end of the impeller part 120.

When the impeller part 120 rotates by the driving device 123, the wing part 121 formed on the impeller part 120 may also rotate to mix the reactants input into the main body 100 with each other so that the reactants react with each other.

The input unit 200 may allow the outer end of the input unit 200 to be fixed to the upper end of the main body 100.

Also, the input unit 200 may be installed in plurality on the upper end of the main body 100 so that the plurality of input units 200 are disposed around the impeller part 120.

That is, since the input units 200 are disposed around the impeller part 120, the reactants input from the input units 200 may be easily mixed to react with each other by the rotation of the wing parts 121 of the impeller part 120.

Each of the input units 200 may have a tube shape for inputting nitrogen ($N_2$), a metal solution, a sodium hydroxide (NaOH) aqueous solution, an aqueous ammonia ($NH_4OH$) solution, and the like.

In the input units 200, a distance from the impeller part 120 may decrease in order of a sodium hydroxide aqueous solution input tube 201, a metal solution input tube 202, and a nitrogen input tube 203 with respect to the impeller part 120, and an aqueous ammonia solution input tube 204 may be disposed at a side opposite to the sodium hydroxide aqueous solution input tube 201, the metal solution input tube 202, and the nitrogen input tube 203 with respect to the impeller part 120.

That is, the input units 200 may be installed close to the impeller part 120 in quick order of the reaction of the reactants.

The filter unit 300 may be detachably installed on the upper end of the main body 100.

The filter unit 300 may be installed in the vicinity of the tube for inputting the aqueous ammonia solution, which is relatively easy to be installed, among the input parts, because the number of tubes is relatively small.

The filter unit 300 may be installed to perpendicularly pass through the upper end of the main body 100, like an embodiment of FIG. 1 or may be installed to perpendicularly pass through a side surface of an upper portion of the main body 100, like another embodiment of FIG. 2.

The filter unit 300 may be selectively installed so that the filter unit 300 is installed on the upper end or the side surface of the upper portion of the man body 100 to optimize a spatial environment in which the co-precipitation reactor is installed.

Figure 3:
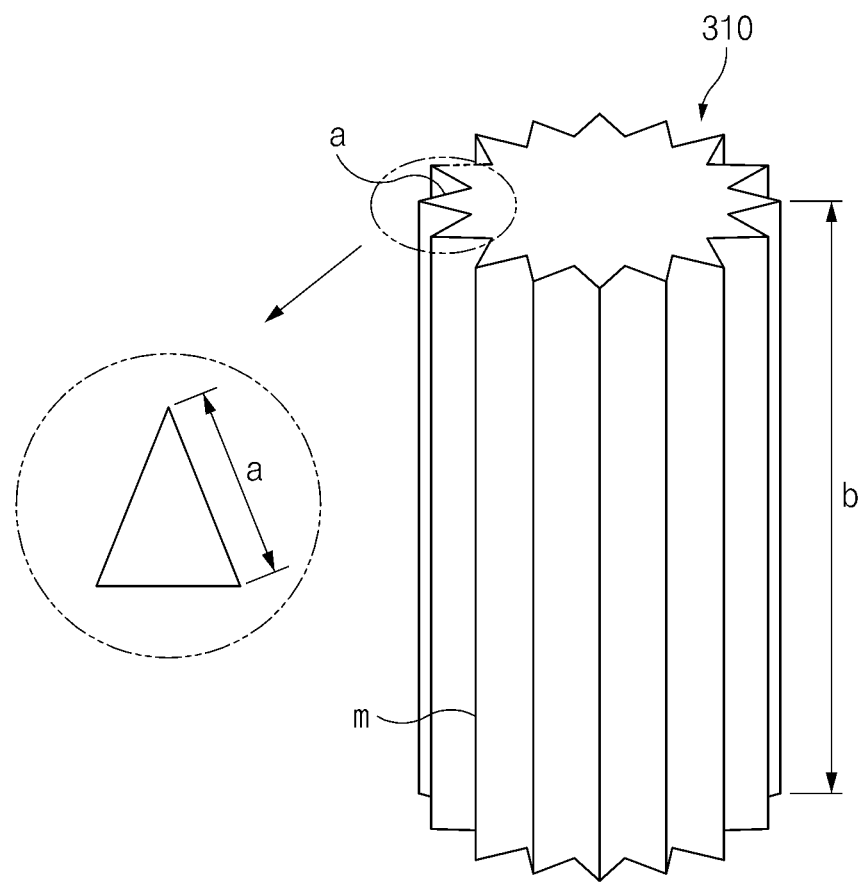
FIG. 3 is a schematic perspective view of a filter of the co-precipitation reactor according to an embodiment of the present invention.

FIG. 3 is a schematic perspective view of a filter of the co-precipitation reactor according to an embodiment of the present invention.

As illustrated in FIGS. 1 to 3, the filter unit 300 may include a filter 310 having a pore size of 3 μm to 5 μm such as a pleated filter and a flow tube 330.

Although not shown, the filter unit 300 may be provided in plurality. The plurality of filter units 300 may be installed on the main body 100 so as to be spaced apart from each other.

The filter 310 formed in each of the plurality of filter units 300 may have pore sizes different from each other within a range of 3 μm to 5 μm.

The filter 310 may be disposed in the main body 100 to filter a precursor of the precursor generated through the reaction of the reactants and the reaction solution.

The reason in which each of the plurality of filters 310 have a pore size of 3 μm to 5 μm is because if the pore size of the filter 310 is less than 3 μm, the reaction solution, which has to pass through the filter 310, does not smoothly pass the pore, and if the pore size of the filter 310 exceeds 5 μm, the precursor is not filtered but passes through the pore.

The filter may be a pleated filter made of a stainless steel (SUS) material. The stainless steel material is resistant to rust due to strong acid resistance and has long lifespan due to strong rigidity.

The pleated filter may have a three-dimensional shape to increase in filtration width, be continuously used due to high durability, and has a less quality deviation of the precursor in continuous use.

In the filter 310 according to the present invention, if the number (m) of mountains is 41, and a length (a) and a length (b) of an ridge are respectively 9.5 mm and 200 mm, it may be introduced into a filtration area calculation formula (m×2×a×b) to obtain a value of 155,800 $mm^2$.

Figure 4:
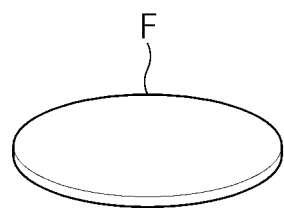
FIG. 4 is a front view of a felt filter according to a related art.

FIG. 4 is a front view of a felt filter according to a related art.

As illustrated in FIG. 4, a felt filter f according to the related art has a thin plate-like planar shape and is a one-time operation due to limited filtration ability and poor durability, and thus, when the felt filter f is continuously used, the quality deviation of the precursor is large (the filter according to the related art has a shape in which the plate-like planar filter only closes the opening of the flow tube).

When a filtration area of the felt filter according to the related art, which has the same height, which is length from a lower end to an upper end, as that of the pleated filter of FIG. 3 according to the present invention is calculated, a value of 3.14×100×100=31400 $mm^2$ may be obtained when a diameter is 200 mm.

Figure 5:
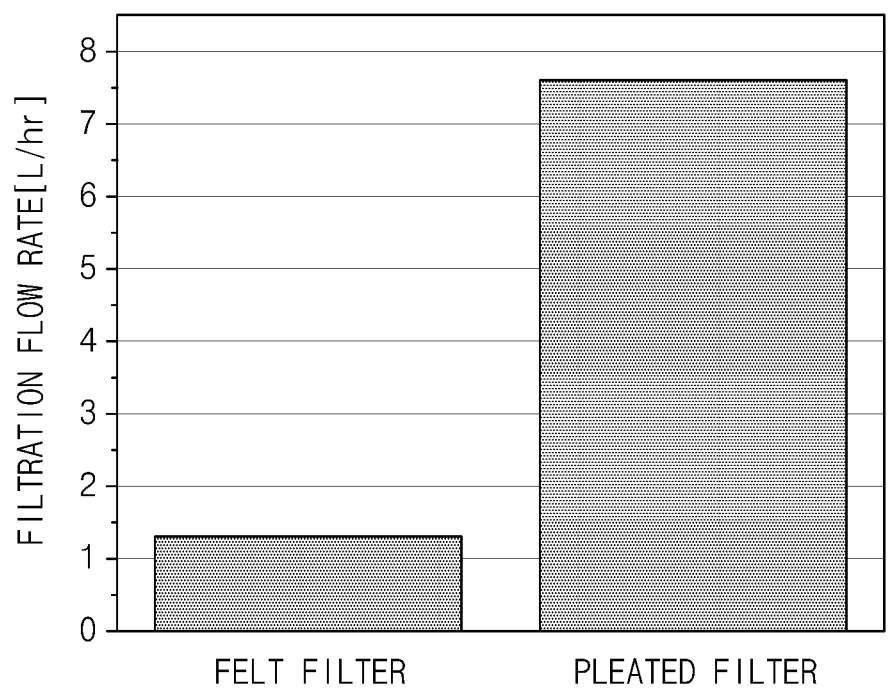
FIG. 5 is a graph illustrating filtration flow rates of a pleated filter according to the present invention and the felt filter according to the related art.

FIG. 5 is a graph illustrating filtration flow rates of the pleated filter according to the present invention and the felt filter according to the related art.

As illustrated in FIG. 5, when it is assumed that the filtration flow rate per unit area is the same in the application standard of the filtering devices having the same height, a difference in filtration flow rate is 4.9 times.

The filter 310 formed in each of the plurality of filter units 300 has different pore sizes, and thus, the filters 310 may operate in order from the filter having the relatively small pore size to the filter having the relatively large pore size according to an operation time preset by the control unit 400.

That is, the preset operation time is differently set according to the pore sizes of the plurality of filters 310, and the preset operation time may increase according to the pore sizes.

According to an embodiment, the filter having a pore size of 3 μm is set to an operation time of 25 hours. After 25 hours pass, the filter having the pore size of 3 μm is stopped, and the filter having the pore size of 4 μm operates. Here, the filter having the pore size of 4 μm is set to an operation time of 65 hours. After 65 hours pass, the filter having the pore size of 4 μm is stopped, and the filter having a pore size of 5 μm operate.

The flow tube 330 may be connected to the filter 310 to extend to the outside of the main body 100 so that the precursor of the precursor generated through the reaction with the reactants and the reaction solution adheres to the outside of the filter 310, and the reaction solution passes through the filter 310 and then is induced by the flow tube 330 so as to be discharged to the outside of the main body 100.

In the co-precipitation reactors according to an embodiment and another embodiment of the present invention, a process of detaching the precursor adhering to the filter unit 300 is performed during a pause for which the input of the reactants into the input unit 200 is stopped, and also, the mixing of the reactants by using the impeller 120 is stopped.

However, the present invention is not limited thereto. For example, while the reaction is performed by the impeller part 120 of the present invention, the process of detaching the precursor adhering to the filter unit 300 may be performed.

Figure 6:
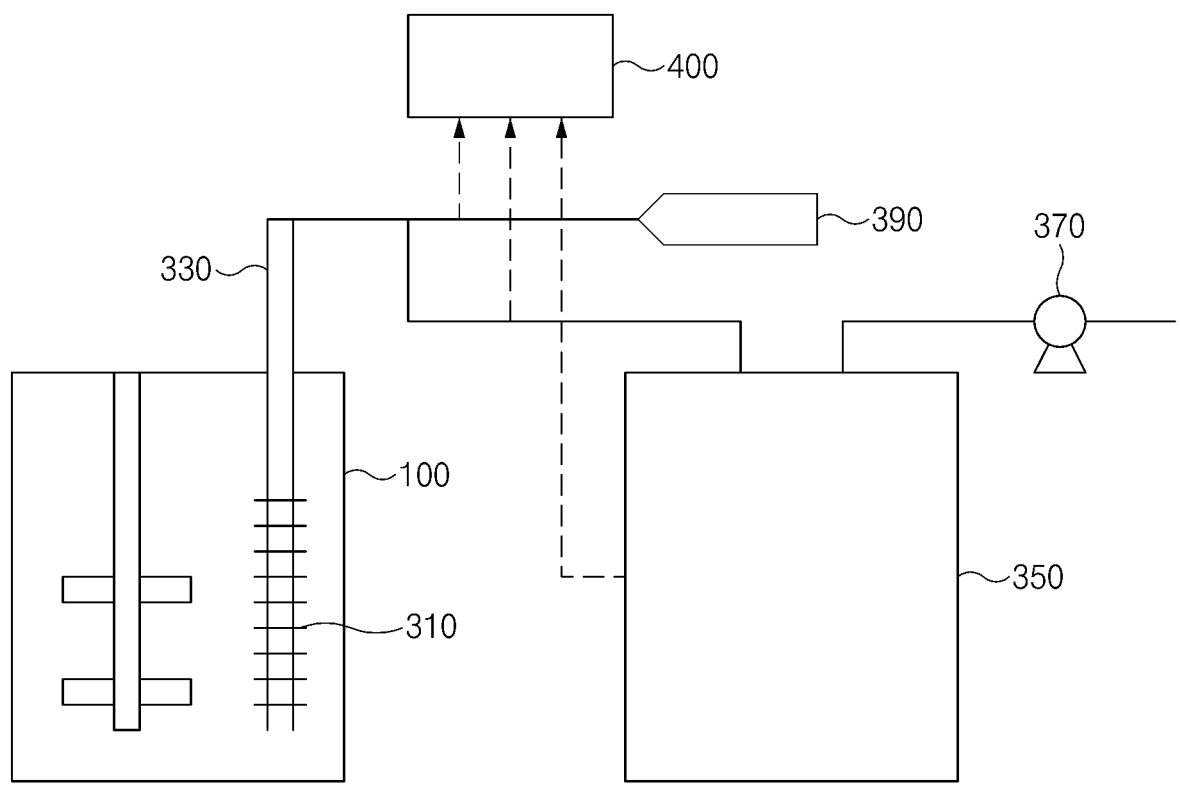
FIG. 6 is a view illustrating a main part of a co-precipitation reactor according to further another embodiment of the present invention.

FIG. 6 is a view illustrating a main part of a co-precipitation reactor according to further another embodiment of the present invention.

As illustrated in FIG. 6, a co-precipitation reactor according to further another embodiment of the present invention may further include a collection tank 350, a vacuum pump 370, an injection unit 390, and a control unit 400.

The collection tank 350 may communicate with a flow tube 330 to collect a reaction solution discharged into the flow tube 330.

The vacuum pump 370 communicating with the collection tank 350 to drain the reaction solution within a main body 100 into the collection tank 350 through the flow tube 330 may be installed in the collection tank 350.

The injection unit 390 may communicate with the flow tube 330 to inject an inert material into a filter 310 through the flow tube 330.

The inert material injected from the injection unit 390 into the filter 310 may perform a back flushing function of detaching a precursor adhering to a surface of the filter 310 from the filter 310 while performing the filtering using the filter 310.

The inert material may be an inert gas such as nitrogen ($N_2$), helium (He) or the like, or an inert liquid such as liquid nitrogen or the like.

The control unit 400 may control operations of the collection tank 350, the vacuum pump 370, and the injection unit 390.

That is, the control unit 400 may control the operations so that an amount of reaction solution collected into the collection tank 350 is adjusted to a predetermined amount, and the reaction solution collected into the collection tank 350 is discharged when a preset amount of reaction solution is filled.

A detection sensor may be installed in the collection tank 350 to measure an amount of reaction solution collected in the collection tank 350.

Also, the control unit 400 may allow the vacuum pump 370 to operate so that the reaction solution is drained when the amount of reaction solution collected into the collection tank 350 is less than the preset amount and may allow the vacuum pump 370 to be stopped so that the reaction solution is prevented from flowing to the collection tank 350 when the preset amount of reaction solution collected into the collection tank 350 is filled by the preset amount.

Also, the control unit 400 may allow the injection unit 390 to operate so as to detach the precursor attached to the filter 310. The control unit 400 may allow the injection unit 390 to operate so as to detach the precursor attached to the filter 310 when the operation of the vacuum pump 370 is stopped.

Hereinafter, the present invention will be described in detail with reference to experimental examples. However, embodiments of the present invention may be embodied in different forms and should not be constructed as limited to the foregoing embodiments set forth herein. Rather, the embodiments of the present invention are provided so that this disclosure will be thorough and complete, and will fully convey the scope of the present invention to those skilled in the art.

Example 1

NiSO$_4$, CoSO$_4$, and MnSO$_4$ were mixed in water in an amount so that a molar ratio of nickel: cobalt: manganese is 6:2:2 to prepare a transition metal-containing solution of 2.4 M.

Referring to FIG. 1, a container containing the transition metal-containing solution 202, a NaOH (sodium hydroxide) aqueous solution 201, and 9 wt % NH$_4$OH (aqueous ammonia) aqueous solution 204 were prepared to be connected to main bodies 100 of reactors (70 L), respectively.

20 L of deionized water was input into the main body 100 of the reactor, and a nitrogen gas was purged into the reactor at a rate of 10 L/min to remove dissolved oxygen in the water, thereby forming a non-oxidizing atmosphere in the reactor. Thereafter, 40 mL of a 25 wt % NaOH aqueous solution 201 and 870 mL of 9 wt % NH$_4$OH aqueous solution 204 were input and stirred at a stirring rate of 50 rpm at a temperature of 50° C. to maintain a pH of 12.2 in the reactor.

Thereafter, 8 mol of the transition metal-containing solution 202 per hour, 16 mol of the NaOH aqueous solution 201 per hour, and 2.4 mol of the NH$_4$OH aqueous solution 204 per hour were respectively input into the reactors to react for 240 minutes to form a particle nucleus of nickel cobalt manganese composite metal hydroxide.

Sequentially, the transition metal-containing solution 202, the NaOH aqueous solution 201, and the NH$_4$OH aqueous solution 204 were input to a pH of 11.6 to induce growth of particles of the nickel cobalt manganese composite metal hydroxide. Thereafter, the reaction was maintained for 3 hours to grow the nickel cobalt manganese composite metal hydroxide particles, and the main body 100 of the reactor (70 L) was fully filled. When the main body 100 of the reactor is fully filled, while a reaction-completed solvent is continuously discharged through the filtering device disposed in the main body 100 of the reactor to the outside of the main body 100 of the reactor, the transition metal-containing solution 202, the NaOH aqueous solution 201, and the NH$_4$OH aqueous solution 204 were continuously input to maintain the reaction for 73 hours, thereby growing the nickel cobalt manganese composite metal hydroxide particles. Then, the resultant nickel cobalt manganese composite metal hydroxide particles were separated and washed with water and then dried in an oven at 120° C. to prepare a Ni$_{0.6}$Co$_{0.2}$Mn$_{0.2}$(OH)$_2$ precursor.

Comparative Example 1

A positive electrode active material precursor was prepared using a continuous stirred-tank reactor (CSTR).

NiSO$_4$, CoSO$_4$, and MnSO$_4$ were mixed in water in an amount so that a molar ratio of nickel: cobalt: manganese is 6:2:2 to prepare a transition metal-containing solution of 2.4 M. 8 mol of a transition metal-containing solution per hour, 16 mol of a NaOH aqueous solution per hour, and 2.4 mol of the NH$_4$OH aqueous solution per hour were input into a continuous stirred-tank reactor (CSTR). A temperature of the reactor was adjusted to 50° C. and stirred at a rate of 400 rpm to precipitate nickel-cobalt manganese composite metal hydroxide. The resultant nickel cobalt manganese composite metal hydroxide particles were separated and washed with water and then dried in an oven at 120° C. to prepare a Ni$_{0.6}$Co$_{0.2}$Mn$_{0.2}$(OH)$_2$ precursor (BET specific surface area: 7.2 m$^2$/g, tap density: 2.02 g/cc, and aspect ratio: 0.86).

Comparative Example 2

40 mol of a transition metal-containing solution per hour, 80 mol of a NaOH aqueous solution per hour, and 12 mol of the NH$_4$OH aqueous solution per hour were respectively input to maintain reaction for 12 hours by using a batch reactor, thereby growing nickel cobalt manganese composite metal hydroxide until the reactor (70 L) is fully filled. A $Ni_{0.6}Co_{0.2}Mn_{0.2}(OH)_2$ precursor was prepared in the same manner as Example 1 except that reaction was finished when the reactor was fully filled (BET specific surface area: 8.5 $m^2/g$, tap density: 1.84 g/cc, and aspect ratio: 0.89).

Experimental Example 1: Evaluation of Particle Size Distribution

Figure 10:
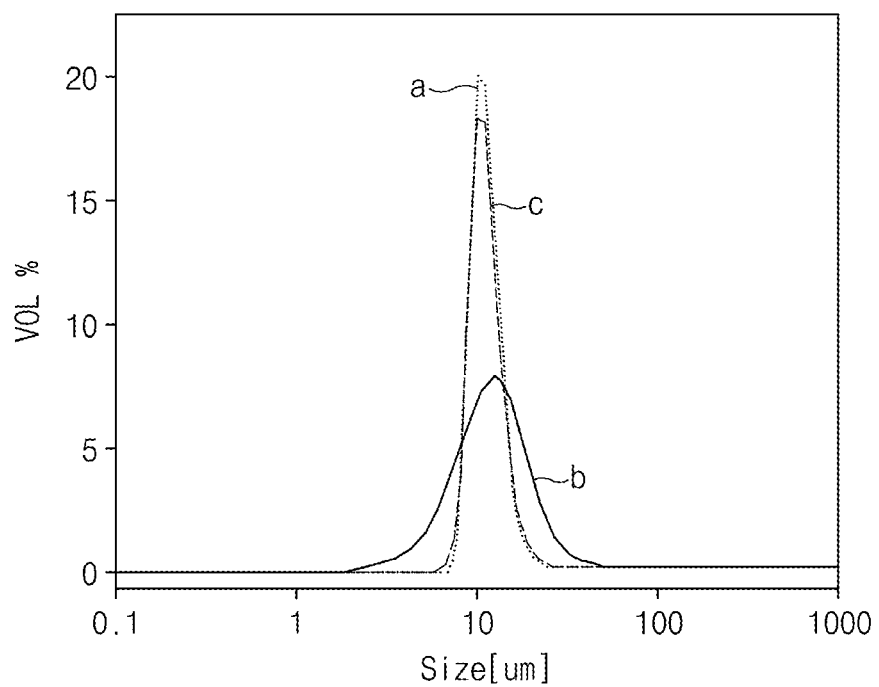
FIG. 10 is a distribution diagram illustrating particle size distribution based on volumes of the precursors prepared according to Embodiment and Comparative Examples of the present invention.

In order to confirm particle size distribution of the positive electrode active material precursor particles prepared in Example 1 and Comparative Examples 1 and 2, a particle size of a positive electrode active material precursor produced in Example 1 and Comparative Examples 1 and 2 was measured by using S-3500 from Microtrac Company, and the results were shown in FIG. 10.

As illustrated in FIG. 10, it was confirmed that when the continuous condensation reaction according to Example 1 was performed, the positive electrode active material precursor having narrow particle size distribution is prepared when compared to Comparative Examples 1 and 2. Therefore, it was seen that the positive electrode active material precursor prepared according to Example 1 was more uniform in particle size than the positive electrode active material precursors prepared according to Comparative Examples 1 and 2.

Figure 7:
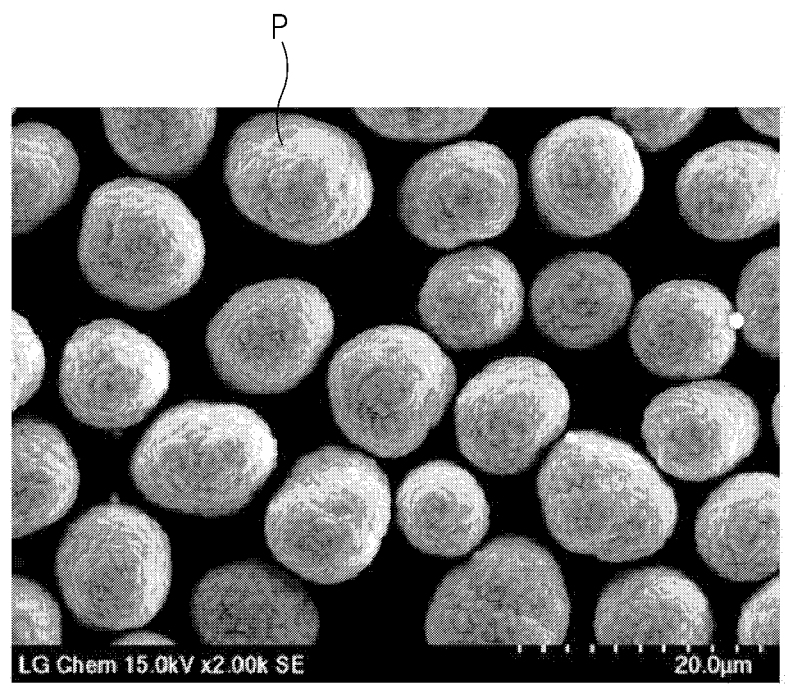
FIG. 7 is an SEM photograph of a precursor prepared according to Embodiment of the present invention.
Figure 8:
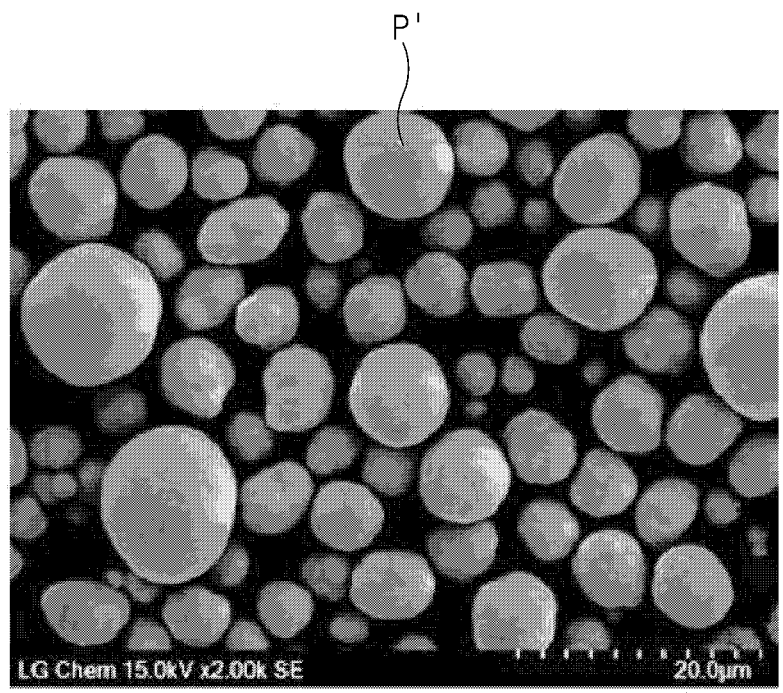
FIG. 8 is an SEM photograph of a precursor prepared according to Comparative Example 1 of the present invention.
Figure 9:
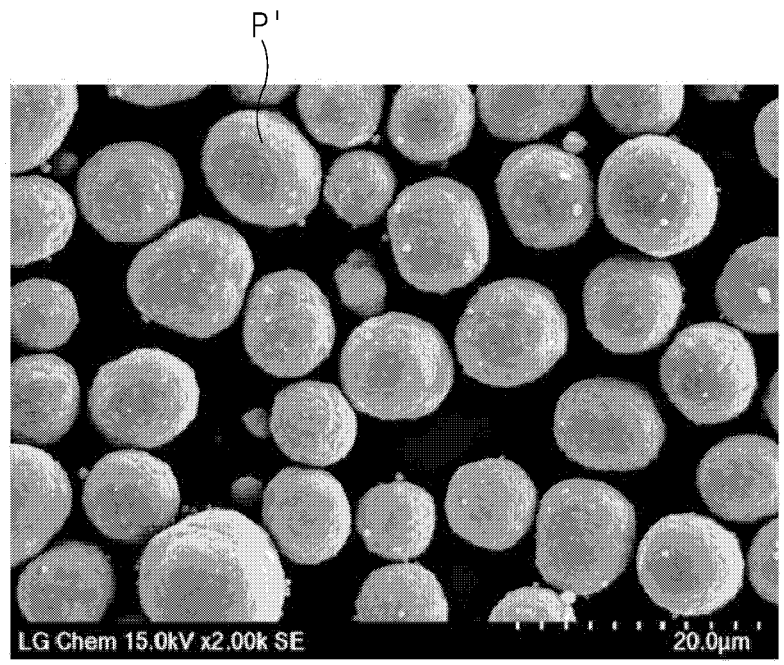
FIG. 9 is an SEM photograph of a precursor prepared according to Comparative Example 2 of the present invention.

FIG. 7 is a scanning electron microscope (SEM) photograph of a precursor prepared according to Embodiment of the present invention, FIG. 8 is an SEM photograph of a precursor prepared according to Comparative Example 1 of the present invention, and FIG. 9 is an SEM photograph of a precursor prepared according to Comparative Example 2 of the present invention.

As illustrated in FIGS. 7 to 9, it is seen that the precursor P prepared according to Example 1 is uniform in size when compared to the precursor P' prepared according to Comparative Example 1 and Comparative Example 2.

FIG. 10 is a distribution diagram illustrating particle size distribution based on volumes of the precursors prepared according to Example 1 and Comparative Examples of the present invention.

Referring to FIG. 10, it is confirmed that the precursor a prepared according to Example 1 has narrow particle size distribution when compared to the precursor b prepared according to Comparative Example 1 and the precursor c prepared according to Comparative Example 2.

Thus, it is seen that the size of the precursor a prepared according to Example is the most uniform.

As described above, according to the present invention, the production yield of the precursor may be improved.

According to the present invention, the filter unit is formed in such a manner that the sizes of the pores of the plurality of pleated filters may be different from each other within a range of 3 μm to 5 μm to improve the filtration flow rate and realize the continuous filtering system.

According to the present invention, the inert material injected into the filter from the injection unit during the production process may perform the back flushing for detaching the precursor attached to the surface of the filter from the filter while performing the filtering through the filter.

According to the present invention, since the filter unit is detachable, all the continuous filtering system, the batch system, and the continuous stirred-tank reactor (CSTR) may be utilized.

According to the present invention, the quality deviation of the produced precursor may be uniform.

Although the co-precipitation reactor according to the present invention has been described above with reference to the exemplary drawings, various changes and modifications may be made thereto by one skilled in the art without departing from the scope and spirit of the invention as set forth in the appended claims.

The invention claimed is:

1. A co-precipitation reactor comprising:
    a main body accommodating a reactant for reaction therein;
    an input unit inputting the reactant into the main body; and
    a filter unit installed in the main body to filter a precursor of the precursor generated by reacting with the reactant in the main body and a reaction solution,
    wherein the filter unit is provided in plurality so as to be spaced apart from each other,
    wherein each of the plurality of filter units comprises a filter so as to provide a plurality of filters, and wherein the filters have different pore sizes.

2. The co-precipitation reactor of claim 1, wherein the main body comprises a drain part for discharging the precursor within the main body to the outside.

3. The co-precipitation reactor of claim 2, wherein the drain part is formed on one or more of a lower portion of the main body or an upper circumferential portion of the main body.

4. The co-precipitation reactor of claim 1, wherein the main body comprises an impeller part for mixing the reactants within the main body at a central portion of the inside thereof.

5. The co-precipitation reactor of claim 4, wherein the impeller part is fixed to an upper end of the main body, and
    the input unit is provided in plurality on the upper end of the main body so as to be disposed around the impeller part.

6. The co-precipitation reactor of claim 1; and
    wherein the filter unit comprises a flow tube formed to be connected to the filter, extending to the outside of the main body, and discharging the reaction solution, from which the precursor is filtered by the filter, to the outside.

7. The co-precipitation reactor of claim 6, further comprising a collection tank communicating with the flow tube to collect the reaction solution discharged into the flow tube.

8. The co-precipitation reactor of claim 7, further comprising a vacuum pump communicating with the collection tank to drain the reaction solution within the main body from the flow tube to the collection tank.

9. The co-precipitation reactor of claim 8, further comprising a control unit controlling an operation of the vacuum pump.

10. The co-precipitation reactor of claim 6, further comprising an injection unit communicating with the flow tube to inject an inert material into the filter through the flow tube.

11. The co-precipitation reactor of claim 10, wherein the inert material injected from the injection unit into the filter detaches the precursor adhering to the filter.

12. The co-precipitation reactor of claim 10, wherein the inert material comprises an inert gas or an inert liquid.

13. The co-precipitation reactor of claim 10, further comprising a control unit controlling an operation of the injection unit.

14. The co-precipitation reactor of claim 6, wherein the filter comprises a pleated filter.

15. The co-precipitation reactor of claim 6, wherein the filter is made of a stainless steel (SUS) material.

16. The co-precipitation reactor of claim 13, wherein the filters operate in an order from a filter having a relatively small pore size to a filter having a relatively large pore size according to an operation time preset by the control unit.

17. The co-precipitation reactor of claim 16, wherein the preset operation time is differently set according to the pore sizes of the plurality of filters, and
as the pore size increases, the preset operation time increases.

18. The co-precipitation reactor of claim 16, wherein, in the filter formed in each of the plurality of filter units, when one filter operates by the control unit, operations of other filters are stopped.

19. The co-precipitation reactor of claim 11, wherein the inert material comprises an inert gas or an inert liquid.

* * * * *